United States Patent
Kuroda

(10) Patent No.: US 12,267,617 B2
(45) Date of Patent: Apr. 1, 2025

(54) WORKER TERMINAL, MOVING IMAGE PROCESSING METHOD AND MOVING IMAGE PROCESSING PROGRAM

(71) Applicants: DAIKIN INDUSTRIES, LTD., Osaka (JP); Fairy Devices Inc., Tokyo (JP)

(72) Inventor: Yuuko Kuroda, Osaka (JP)

(73) Assignees: DAIKIN INDUSTRIES, LTD., Osaka (JP); Fairy Devices Inc., Tokyo (JP)

( * ) Notice: Subject to any disclaimer, the term of this patent is extended or adjusted under 35 U.S.C. 154(b) by 26 days.

(21) Appl. No.: 18/256,742

(22) PCT Filed: Dec. 22, 2021

(86) PCT No.: PCT/JP2021/047620
§ 371 (c)(1),
(2) Date: Jun. 9, 2023

(87) PCT Pub. No.: WO2022/138737
PCT Pub. Date: Jun. 30, 2022

(65) Prior Publication Data
US 2024/0031516 A1    Jan. 25, 2024

(30) Foreign Application Priority Data

Dec. 23, 2020  (JP) .................................. 2020-214111

(51) Int. Cl.
*H04N 5/268* (2006.01)
*G06V 20/52* (2022.01)
(Continued)

(52) U.S. Cl.
CPC ............. *H04N 5/268* (2013.01); *G06V 20/52* (2022.01); *H04N 7/183* (2013.01); *H04N 23/667* (2023.01)

(58) Field of Classification Search
None
See application file for complete search history.

(56) References Cited

U.S. PATENT DOCUMENTS

| 2004/0010803 A1 | 1/2004 | Berstis |
| 2016/0007026 A1 | 1/2016 | Dong et al. |

(Continued)

FOREIGN PATENT DOCUMENTS

| JP | 2008-263647 | 10/2008 |
| JP | 2015-130071 | 7/2015 |

(Continued)

OTHER PUBLICATIONS

International Search Report for PCT/JP2021/047620 mailed on Mar. 8, 2022.
(Continued)

*Primary Examiner* — Eileen M Adams
(74) *Attorney, Agent, or Firm* — IPUSA, PLLC

(57) ABSTRACT

The communication amount is reduced while maintaining image quality when transmitting moving images by using a worker terminal. A worker terminal is configured to be connected to a support apparatus and transmit a moving image to the support apparatus upon encoding the moving image, the support apparatus being configured to support, from a remote location, work performed by a worker including installing, repairing, inspecting, or removing a device, based on the moving image captured at a work site, the worker terminal including a camera configured to capture the moving image; an identifying unit configured to perform a recognition process on the moving image captured by the camera to identify a target area; and a processing unit configured to process the moving image such that a data amount per unit area at a time of transmitting the moving image is different for the target area and a non-target area other than the target area, in response to detecting that the target area is identified in the moving image.

21 Claims, 11 Drawing Sheets

(51) Int. Cl.
  *H04N 7/18* (2006.01)
  *H04N 23/667* (2023.01)

(56) References Cited

U.S. PATENT DOCUMENTS

| | | |
|---|---|---|
| 2017/0132554 A1* | 5/2017 | Oonishi .................. G06V 40/28 |
| 2019/0174125 A1* | 6/2019 | Ninan .................. H04N 21/816 |
| 2020/0099973 A1 | 3/2020 | Mizutani et al. |
| 2020/0151487 A1 | 5/2020 | Yonezawa |

FOREIGN PATENT DOCUMENTS

| | | |
|---|---|---|
| JP | 2018-026692 | 2/2018 |
| JP | 2018-160795 | 10/2018 |
| JP | 2018-195913 | 12/2018 |
| JP | 2019-032725 | 2/2019 |
| JP | 2020-053760 | 4/2020 |
| JP | 2020-170406 | 10/2020 |

OTHER PUBLICATIONS

International Preliminary Report on Patentability for PCT/JP2021/047620 mailed on Jul. 6, 2023.
Extended European Search Report for 21910877.6 dated Oct. 29, 2024.

* cited by examiner

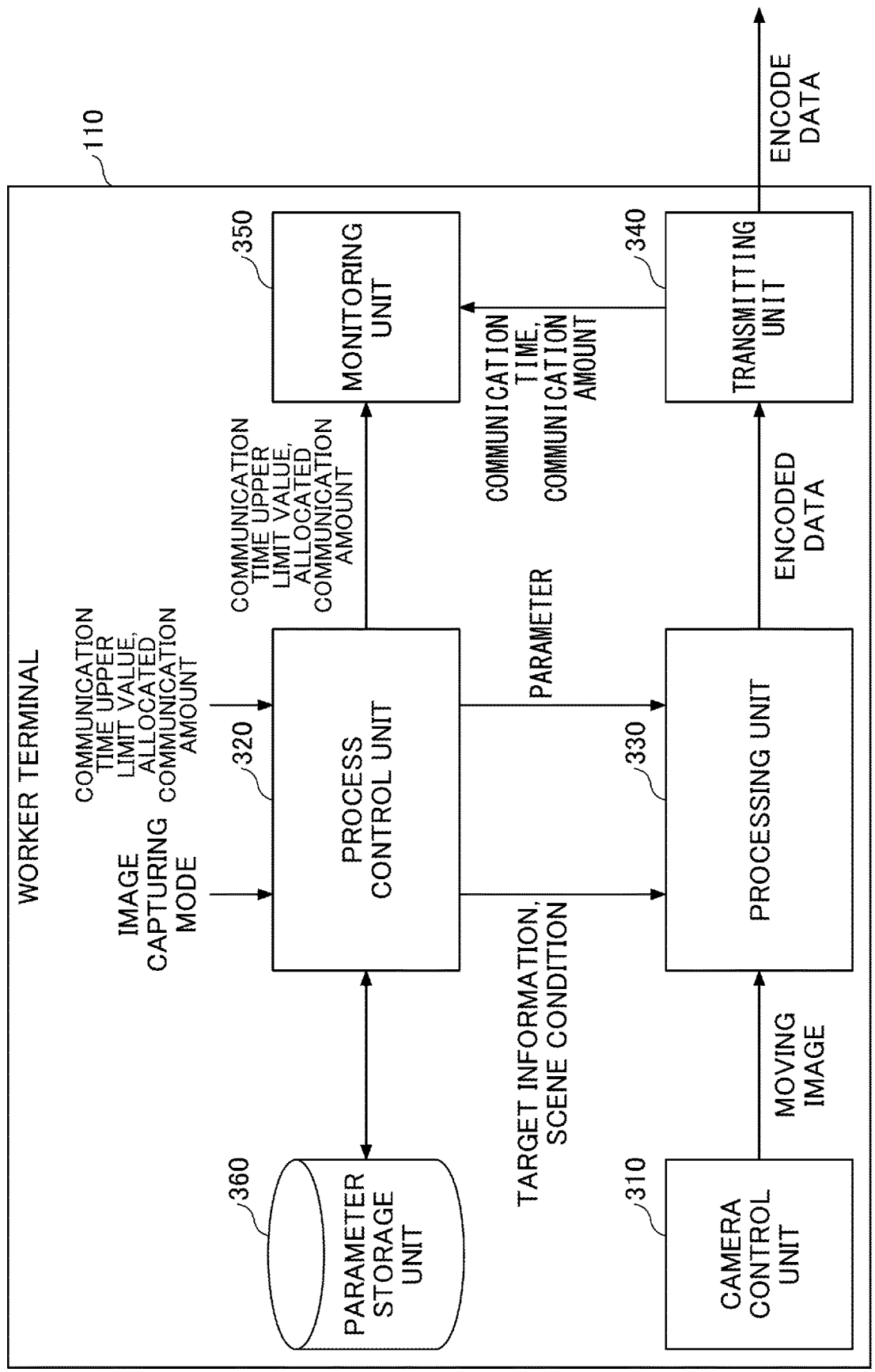

FIG.4

440 — IMAGE CAPTURING MODE 4=EQUIPMENT MAINTENANCE (MIDDLE RESOLUTION, MIDDLE FRAME RATE)
430 — IMAGE CAPTURING MODE 3=WORK SUPPORT (HIGH RESOLUTION, HIGH FRAME RATE)
420 — IMAGE CAPTURING MODE 2= FIELD INVESTIGATION (LOW RESOLUTION, HIGH FRAME RATE)
410 — IMAGE CAPTURING MODE 1=EQUIPMENT INSPECTION (HIGH RESOLUTION, LOW FRAME RATE)

| SCENE (TYPE OF WORK CONTENT) | TARGET | PARAMETER | | | | ALLOCATED COMMUNICATION AMOUNT | COMMUNICATION TIME UPPER LIMIT VALUE |
|---|---|---|---|---|---|---|---|
| | | RESOLUTION | FRAME RATE | KEY FRAME INTERVAL | QUANTIZATION VALUE | | |
| DURING MOVING | — | R5 | Fr3 | Ki2 | Q5 | XX1 | YY1 |
| DURING INSPECTION | AIR CONDITIONER | R10 | Fr3 | Ki1 | Q1 | | |
| | OTHER THAN AIR CONDITIONER | R5 | | | Q3 | | |

441 — IMAGE CAPTURING MODE 4=EQUIPMENT MAINTENANCE (MIDDLE RESOLUTION, MIDDLE FRAME RATE)
431 — IMAGE CAPTURING MODE 3=WORK SUPPORT (HIGH RESOLUTION, HIGH FRAME RATE)
421 — IMAGE CAPTURING MODE 2= FIELD INVESTIGATION (LOW RESOLUTION, HIGH FRAME RATE)
411 — IMAGE CAPTURING MODE 1=EQUIPMENT INSPECTION (HIGH RESOLUTION, LOW FRAME RATE)

| SCENE (TYPE OF WORK CONTENT) | TARGET | PARAMETER | | | | ALLOCATED COMMUNICATION AMOUNT | COMMUNICATION TIME UPPER LIMIT VALUE |
|---|---|---|---|---|---|---|---|
| | | RESOLUTION | FRAME RATE | KEY FRAME INTERVAL | QUANTIZATION VALUE | | |
| DURING MOVING | — | R5' | Fr3' | Ki2' | Q5' | XX1' | YY1' |
| DURING INSPECTION | AIR CONDITIONER | R10' | Fr3' | Ki1' | Q1' | | |
| | OTHER THAN AIR CONDITIONER | R5' | | | Q3' | | |

WORKER TERMINAL, MOVING IMAGE PROCESSING METHOD AND MOVING IMAGE PROCESSING PROGRAM

TECHNICAL FIELD

The present disclosure relates to a worker terminal, a moving image processing method, and a moving image processing program.

BACKGROUND ART

At a work site where a device is installed, repaired, inspected, removed, etc., by using a worker terminal such as a mobile terminal, etc., the work efficiency is being improved. For example, by using a worker terminal to capture an image of the work site and transmitting a moving image to an administrator at a remote location, the worker can receive appropriate support from the remote location (for example, voice instructions) in real time, and work efficiently.

CITATION LIST

Patent Documents (Patent document 1) Japanese Unexamined Patent Application Publication No. 2020-53760
(Patent document 2) Japanese Unexamined Patent Application Publication No. 2018-160795

SUMMARY OF INVENTION

Technical Problem

However, transmission of moving images involves communication costs. Therefore, when using a worker terminal, it is necessary to reduce the communication amount during transmission. On the other hand, it is necessary to maintain a certain level of image quality of the moving images to be transmitted in order to receive appropriate support from a remote location at the work site.

An objective of the present disclosure is to reduce the communication amount while maintaining image quality when transmitting moving images by using a worker terminal.

Solution to Problem

A worker terminal of the first aspect of the present disclosure is
 a worker terminal configured to be connected to a support apparatus and transmit a moving image to the support apparatus upon encoding the moving image, the support apparatus being configured to support, from a remote location, work performed by a worker including installing, repairing, inspecting, or removing a device, based on the moving image captured at a work site, the worker terminal including:
 a camera configured to capture the moving image;
 an identifying unit configured to perform a recognition process on the moving image captured by the camera to identify a target area; and
 a processing unit configured to process the moving image such that a data amount per unit area at a time of transmitting the moving image is different for the target area and a non-target area other than the target area, in response to detecting that the target area is identified in the moving image.

According to the first aspect of the present disclosure, when a moving image is transmitted by using a worker terminal, the communication amount can be reduced while maintaining image quality.

Further, the second aspect of the present disclosure is the worker terminal described in the first aspect, wherein
 the processing unit
  acquires one parameter set among a plurality of parameter sets for processing the moving image, each of the plurality of parameter sets defining parameters that are different for the target area and the non-target area, and
  processes the moving image by switching the parameters for the target area and the non-target area in response to detecting that the target area is identified in the moving image.

Further, the third aspect of the present disclosure is the worker terminal described in the second aspect, further including:
 a storage unit configured to store information used for recognizing a target in the recognition process, wherein
 the identifying unit identifies an area of the target as the target area in response to recognizing the target in the recognition process.

Further, the fourth aspect of the present disclosure is the worker terminal described in the third aspect, wherein
 the storage unit stores a physical amount specifying a peripheral area of the target in association with the information used for recognizing the target in the recognition process, and
 the identifying unit identifies an area of the target and the peripheral area of the target as the target area in response to recognizing the target in the recognition process.

Further, the fifth aspect of the present disclosure is the worker terminal described in any of the first to fourth aspects, wherein the processing unit processes the moving image such that the data amount per unit area at a time of transmitting the moving image in the non-target area is less than the data amount per unit area at the time of transmitting the moving image in the target area.

Further, the sixth aspect of the present disclosure is the worker terminal described in the second aspect, further including:
 an image capturing mode acquiring unit configured to acquire an image capturing mode, wherein
 the processing unit acquires the one parameter set based on the image capturing mode.

Further, the seventh aspect of the present disclosure is the worker terminal described in the sixth aspect, wherein the processing unit acquires the one parameter set based on at least one of a work content, a communication time upper limit value, or an allocated communication amount.

Further, the eighth aspect of the present disclosure is the worker terminal described in the seventh aspect, wherein
 the identifying unit further identifies a scene indicating a type of the work content with respect to the moving image, and
 the processing unit further
  acquires the one parameter set defining parameters that are different for each of the scenes, and
  processes the moving image by switching the parameters for each identified scene.

Further, the ninth aspect of the present disclosure is the worker terminal described in the eighth aspect, wherein the identifying unit identifies the scene with respect to the moving image by referring to a condition predetermined for each scene or by receiving input information for identifying each scene, for identifying each scene based on the moving image.

Further, the tenth aspect of the present disclosure is a worker terminal described in the ninth aspect, wherein the identifying unit identifies the scene with respect to the moving image by referring to image information predetermined for each scene and determining whether any piece of the image information is included in the moving image.

Further, the eleventh aspect of the present disclosure is a worker terminal described in the ninth aspect, wherein the identifying unit identifies the scene with respect to the moving image by determining which piece of predetermined scene information the received input information corresponds to.

Further, a twelfth aspect of the present disclosure is the worker terminal described in the first aspect, wherein the non-target area includes at least one of an area other than the target area in a frame in which the target area is identified in the moving image, or an entire area of a frame in which the target area is not identified in the moving image.

Further, a thirteenth aspect of the present disclosure is the worker terminal described in the twelfth aspect, wherein the processing unit processes the moving image by extracting the target area from the frame in which the target area is identified, or processes the moving image by reducing a resolution of the non-target area to below a resolution of the target area in the frame in which the target area is identified, or processes the moving image by extracting the target area from the frame in which the target area is identified and combining the non-target area with a predetermined still image, or processes the moving image by encoding the moving image upon reducing a quantization value of the non-target area to below a quantization value of the target area in the frame in which the target area is identified.

Further, the fourteenth aspect of the present disclosure is the worker terminal described in the twelfth aspect, wherein the processing unit processes the moving image by thinning the moving image by removing the frame in which the target area is not identified, or processes the moving image by reducing a resolution of the frame in which the target area is not identified to below a resolution of the target area in the frame in which the target area is identified, or processes the moving image by replacing the frame in which the target area is not identified with a predetermined still image, or processes the moving image by encoding the moving image upon reducing a quantization value of the frame in which the target area is not identified to below a quantization value of the target area in the frame in which the target area is identified.

Further, the fifteenth aspect of the present disclosure is the worker terminal described in the eighth aspect, wherein the processing unit processes the moving image by changing a frame rate for each identified scene, or processes the moving image by encoding the moving image upon changing a key frame interval for each identified scene.

Further, the sixteenth aspect of the present disclosure is a worker terminal as described in the sixth aspect, wherein the image capturing mode acquiring unit acquires the image capturing mode by receiving the image capturing mode via a network or by receiving the image capturing mode input by the worker.

Further, the seventeenth aspect of the present disclosure is the worker terminal described in the second aspect, wherein the processing unit acquires the one parameter set by receiving the one parameter set via a network or by extracting the one parameter set from the plurality of parameter sets stored in advance upon receiving a selection from the worker.

Further, the eighteenth aspect of the present disclosure is a worker terminal described in the seventh aspect, further including:

a monitoring unit configured to monitor a communication time or a communication amount based on the communication time upper limit value or the allocated communication amount, wherein the monitoring unit performs control to output a warning or to interrupt the transmitting of the moving image and store the encoded moving image, in response to detecting that the communication time exceeds the communication time upper limit value or the communication amount exceeds the allocated communication amount.

Further, the nineteenth aspect of the present disclosure is the worker terminal described in the eighteenth aspect, further including:

a changing unit configured to change the plurality of parameter sets in response to detecting that the communication time exceeds the communication time upper limit value or the communication amount exceeds the allocated communication amount.

Further, the twentieth aspect of the present disclosure is a worker terminal described in the eighteenth aspect, further including:

a prediction unit configured to predict an additional communication time or an additional communication amount in response to detecting that the communication time exceeds the communication time upper limit value or the communication amount exceeds the allocated communication amount.

Further, a moving image processing method of the twenty-first aspect of the present disclosure is a moving image processing method performed in a worker terminal configured to be connected to a support apparatus and transmit a moving image to the support apparatus upon encoding the moving image, the support apparatus being configured to support, from a remote location, work performed by a worker including installing, repairing, inspecting, or removing a device, based on the moving image captured at a work site, the moving image processing method including:

an identifying step of performing a recognition process on the moving image captured by a camera configured to capture the moving image, to identify a target area; and a processing step of processing the moving image such that a data amount per unit area at a time of transmitting the moving image is different for the target area and a non-target area other than the target area, in response to detecting that the target area is identified in the moving image.

According to the twenty-first aspect of the present disclosure, when a moving image is transmitted for receiving support from a remote location for work at a work site, the communication amount can be reduced while maintaining image quality.

Further, a moving image processing program of the twenty-second aspect of the present disclosure is a moving image processing program that causes a computer in a worker terminal configured to be connected to a support apparatus and transmit a moving image to the support apparatus upon encoding the moving image, the support apparatus being configured to support, from a remote location, work performed by a worker including installing, repairing, inspecting, or removing a device, based on the moving image captured at a work site, to execute:

an identifying step of performing a recognition process on the moving image captured by a camera configured to capture the moving image, to identify a target area; and a processing step of processing the moving image such that a data amount per unit area at a time of transmitting the moving image is different for the target area and a non-target area other than the target area, in response to detecting that the target area is identified in the moving image.

According to the twenty-second aspect of the present disclosure, when a moving image is transmitted for receiving support from a remote location for work at a work site, the communication amount can be reduced while maintaining image quality.

BRIEF DESCRIPTION OF DRAWINGS

FIG. 3 illustrates an example of a functional configuration of a worker terminal.

FIG. 4 illustrates an example of a parameter set stored in a parameter storage unit.

DESCRIPTION OF EMBODIMENTS

Each embodiment will be described below with reference to the accompanying drawings. In the present specification and drawings, with respect to elements having substantially the same functional configuration, duplicate descriptions are omitted by applying identical symbols.

First Embodiment

<System Configuration of Remote Support System>

Figure 1:
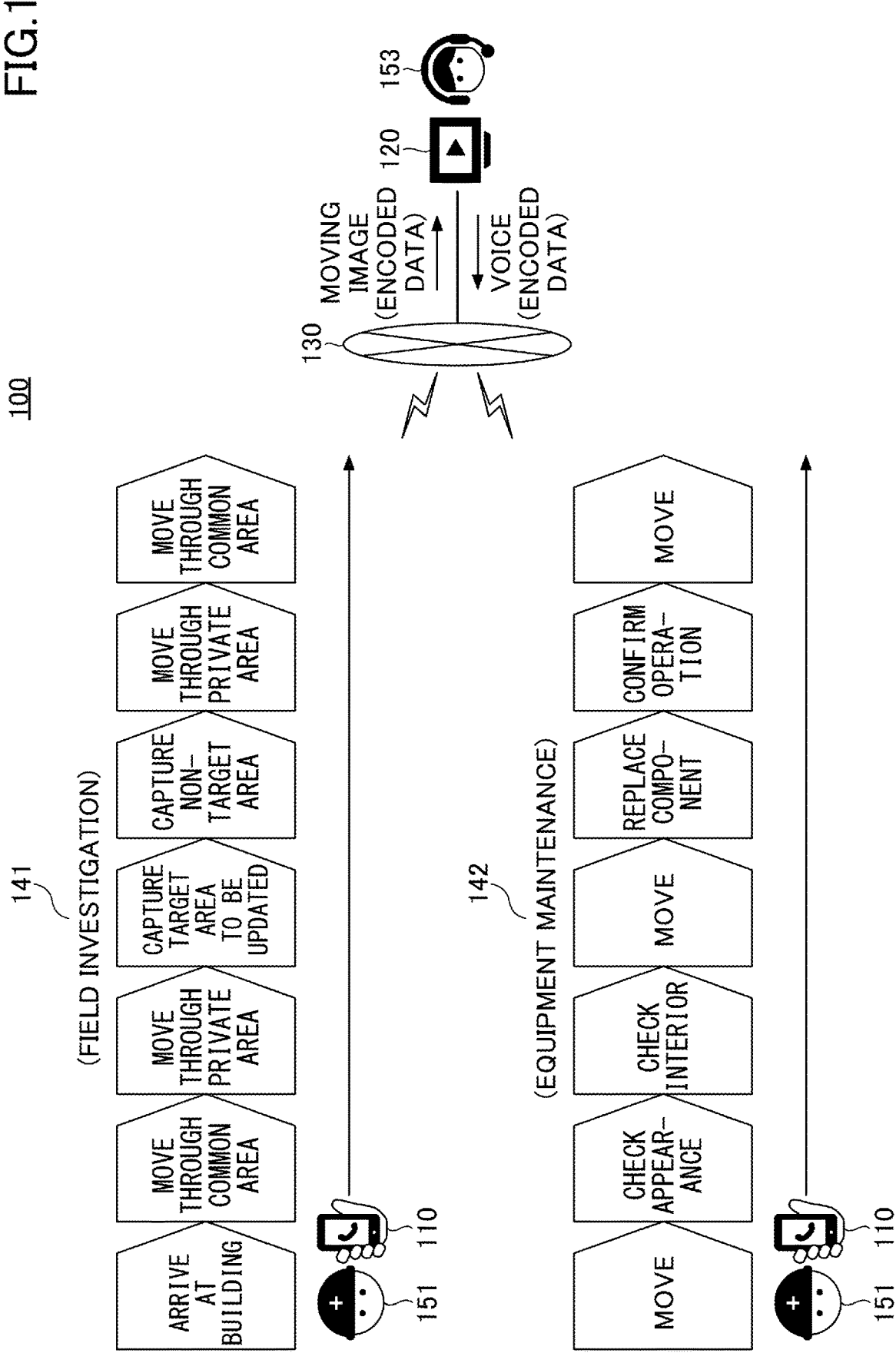
FIG. 1 illustrates an example of a system configuration of a remote support system.

First, the system configuration of a remote support system including a worker terminal according to the first embodiment will be described. FIG. 1 illustrates an example of the system configuration of the remote support system.

As illustrated in FIG. 1, a remote support system 100 includes a worker terminal 110 and an administrator terminal 120. In the remote support system 100, the worker terminal 110 and the administrator terminal 120 are communicably connected via a network 130.

The worker terminal 110 is a mobile terminal used at a work site where a device is installed, repaired, inspected, removed, etc. In FIG. 1, a reference numeral 141 denotes a case where the worker terminal 110 is used by a worker 151 to perform field investigation in a work site.

As illustrated by the reference numeral 141, in the case of work content=field investigation, after arriving at the building, the worker 151 moves toward the target area to update (remove and install) a device (an air conditioner in the present embodiment) by moving through a common area and a private area. At this time, the worker 151 reports the start of the field investigation to an administrator 153 while capturing images by using the worker terminal 110.

Then, the worker 151 captures the target area at which a device is to be updated and a non-target area at which a device is not to be updated, by using the worker terminal 110 while receiving voice instructions from the administrator 153.

Then, the worker 151 moves out of the building by moving through the private area and the common area. At this time, the worker 151 reports the end of the field investigation to the administrator 153 while capturing images by using the worker terminal 110.

Thus, the worker 151 continues to capture images from the start to the end of the field investigation, and the administrator 153 gives voice instructions to the worker 151 as needed while viewing the moving images captured by the worker 151.

Similarly, in FIG. 1, a reference numeral 142 denotes a case in which a worker 152 uses the worker terminal 110 to perform equipment maintenance at a work site.

As indicated by the reference numeral 142, when work content=equipment maintenance, the worker 152 first moves to the position where the equipment that is the target of maintenance work is installed. At this time, the worker 152 reports the start of equipment maintenance to the administrator 153 while capturing images by using by the worker terminal 110.

Subsequently, the worker 152 checks the appearance and interior of the equipment that is the target of maintenance work. At this time, the worker 152 captures the appearance and interior of the equipment that is the target of maintenance work by using the worker terminal 110 while receiving voice instructions from the administrator 153.

Then, the worker 152 identifies the component to be replaced, goes to the warehouse or the like to retrieve the identified component, and moves again to the position where the equipment that is the target of maintenance work is installed. At this time, the worker 152 makes an interim report of the work to the administrator 153 while capturing images by using the worker terminal 110.

Then, the worker 152 replaces the identified component in the equipment that is the target of maintenance work and confirms the operation of the equipment that is the target of maintenance work while receiving voice instructions from the administrator 153. At this time, the worker 152 captures images by using the worker terminal 110 and reports the state of the work of the component replacement and operation confirmation to the administrator 153.

Then, the worker 152 leaves the equipment that is the target of maintenance work and finishes the work. At this time, the worker 152 reports the end of the equipment maintenance to the administrator 153 while capturing images by using the worker terminal 110.

Thus, the worker 152 continues to capture images from the start to the end of the equipment maintenance, and the administrator 153 gives voice instructions to the worker 152 as needed while viewing the moving images captured by the worker 152.

On the other hand, the administrator terminal 120 is an example of a support apparatus, which receives encoded data of a moving image captured by the workers 151, 152, etc., at a work site via the network 130. Further, the administrator terminal 120 decodes the received encoded data and displays the decoded data to the administrator 153. Thus, the administrator 153 can view the moving images captured by the workers 151, 152 in real time.

Further, the administrator terminal 120 acquires the voice instructions input by the administrator 153 in response to displaying the moving images, and transmits the voice instructions to the worker terminal 110 via the network 130. Thus, the administrator 153 can provide appropriate support to the workers 151, 152 by voice instructions.

In the example of FIG. 1, the case in which the workers 151, 152 use the worker terminal 110 when performing field investigation and equipment maintenance is illustrated, but the case in which the workers 151, 152, etc., use the worker terminal 110 is not limited to these cases. For example, the worker terminal 110 may be used when performing equipment inspection, work support, etc., at the work site.

<Hardware Configuration of Worker Terminal>

Figure 2:
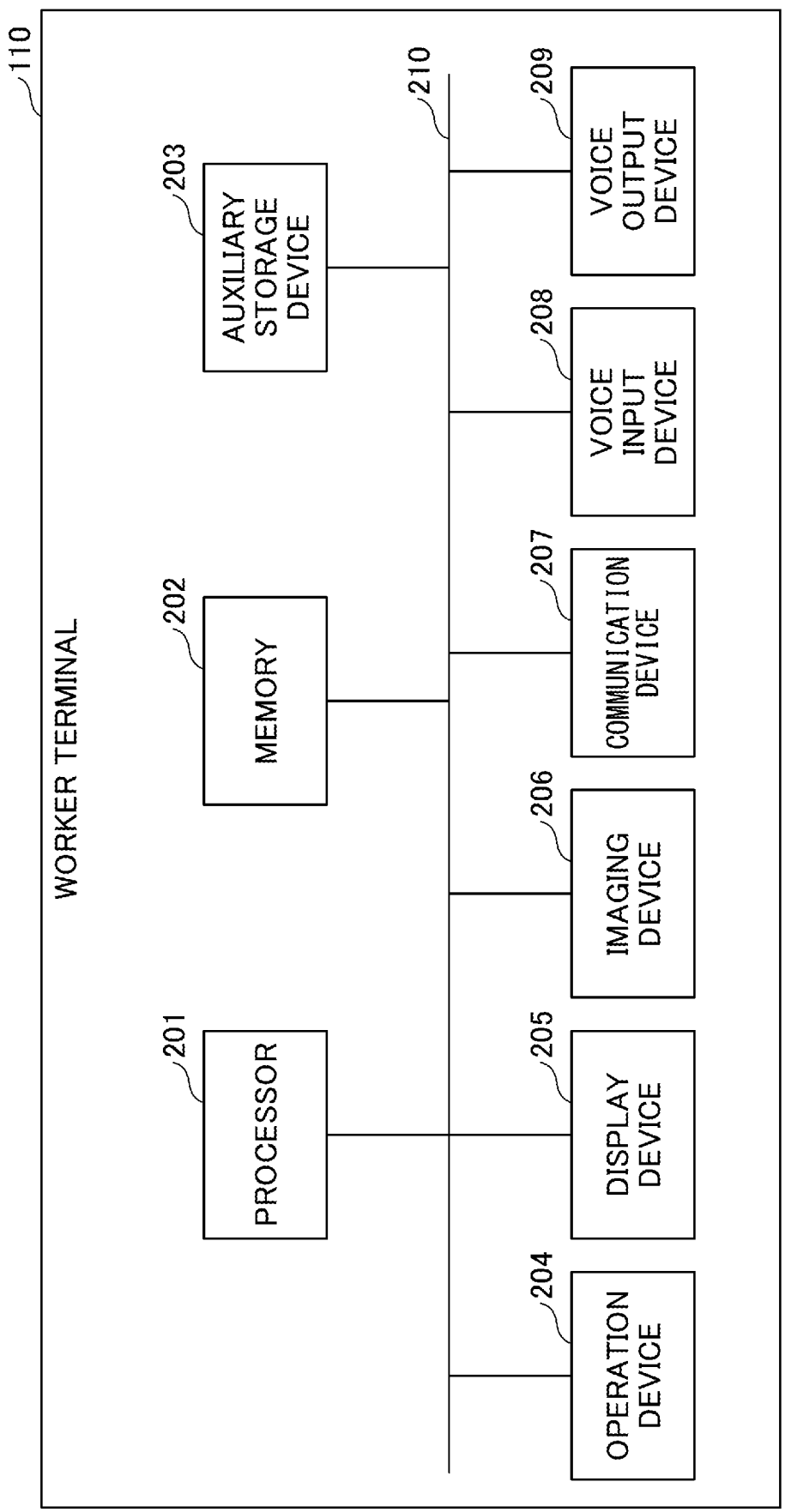
FIG. 2 illustrates an example of a hardware configuration of a worker terminal.

Next, the hardware configuration of the worker terminal 110 will be described. FIG. 2 illustrates an example of the hardware configuration of the worker terminal.

As illustrated in FIG. 2, the worker terminal 110 includes a processor 201, a memory 202, and an auxiliary storage device 203. Further, the worker terminal 110 includes an operation device 204, a display device 205, an imaging device 206, a communication device 207, a voice input device 208, and a voice output device 209. Each piece of hardware of the worker terminal 110 is connected to each other via a bus 210.

The processor 201 includes various computing devices such as a CPU (Central Processing Unit). The processor 201 reads various programs (for example, a moving image processing program to be described later, etc.) into the memory 202 and executes the programs.

The memory 202 includes a main storage device such as a ROM (Read Only Memory), a RAM (Random Access Memory), etc. The processor 201 and the memory 202 form what is referred to as a computer, and the processor 201 executes various programs read into the memory 202, so that the worker terminal 110 implements various functions.

The auxiliary storage device 203 stores various programs and various kinds of data used when various programs are executed by the processor 201. For example, a parameter storage unit 360 described later is implemented in the auxiliary storage device 203.

The operation device 204 receives operation instructions to the worker terminal 110 by the workers 151, 152, etc. The display device 205 displays the results of various processing by the worker terminal 110 to the workers 151, 152, etc.

The imaging device 206 is a camera and generates a moving image by capturing a work site. The communication device 207 communicates with the administrator terminal 120 via the network 130. Various programs and various kinds of data installed in the auxiliary storage device 203 are installed by being downloaded from the network 130 via the communication device 207, for example.

The voice input device 208 is a microphone and receives voice input of the workers 151, 152, etc. The voice output device 209 is a speaker and outputs voice instructions from the administrator 153, for example.

<Functional Configuration of Worker Terminal>

Next, the functional configuration of the worker terminal 110 will be described. FIG. 3 illustrates an example of the functional configuration of the worker terminal. As described above, a moving image processing program is installed in the worker terminal 110, and when the program is executed, the worker terminal 110 functions as a camera control unit 310, a process control unit 320, a processing unit 330, a transmitting unit 340, and a monitoring unit 350.

The camera control unit 310 controls the operation of the imaging device 206. When an instruction to start image capturing is input from the workers 151, 152, etc., the camera control unit 310 starts taking in a moving image captured by the imaging device 206. Further, the camera control unit 310 reports the moving image that has been taken in, to the processing unit 330. Further, the camera control unit 310 finishes taking in the moving image from the imaging device 206 when an instruction to end image capturing is input from the workers 151, 152, etc.

The process control unit 320 is an example of an image capturing mode acquiring unit, which acquires the image capturing mode by receiving input from the workers 151, 152, etc., or by receiving an instruction from the administrator 153 via the network 130. The image capturing mode is associated with a case (field investigation, equipment maintenance, equipment inspection, work support, etc.) in which the workers 151, 152, etc., use the worker terminal 110 at the work site.

Further, the process control unit 320 acquires the upper limit value of the communication time and the allocated communication amount, by receiving input from the workers 151, 152 or by receiving an instruction from the administrator 153 via the network 130.

Further, the process control unit 320 reads a predetermined parameter set from among the multiple parameter sets prestored in the parameter storage unit 360, based on the acquired image capturing mode. The parameter set stored in the parameter storage unit 360 includes a definition of a combination of parameters used when various processing processes are performed on the moving image.

By having a configuration in which a predetermined parameter set is read based on the image capturing mode, it becomes possible to switch the parameter set according to which case the workers 151, 152, etc., use the worker terminal 110 at the work site.

The predetermined parameter sets read based on the image capturing mode includes a plurality of parameter sets with different communication time upper limit values, allocated communication amounts, etc.

Therefore, the process control unit 320 can be configured to further select one parameter set according to the acquired communication time upper limit value or the allocated communication amount, etc., from among the predetermined parameter sets read based on the image capturing mode. By adopting a configuration in which a parameter set is selected based on the communication time upper limit value or the allocated communication amount, the processing unit 330 can perform a processing process by using a parameter set according to the available communication time or communication amount.

Note that, for example, the following pieces of information are defined in the parameter set:
- information used to recognize a target from a moving image (target information used to recognize a predetermined target to be captured for each type of work content),
- a predetermined condition (scene condition) used to identify a scene indicating the type of work content with respect to a moving image, and
- a parameter (parameter for each type of processing process).

Further, the process control unit 320 reports, to the processing unit 330, a parameter set in which target information, scene conditions, and parameters are defined, and reports, to the monitoring unit 350, the acquired communication time upper limit value and allocated communication amount.

The processing unit 330 performs various processing processes on the moving image reported by the camera control unit 310, by using the parameter set reported by the process control unit 320, to generate encoded data. Specifically, the processing unit 330 performs various processing processes on the moving image so that the data amount per unit area of an area other than a target area is less than the data amount per unit area of the area of the target (target area) included in the moving image, and generates encoded data. Further, the processing unit 330 reports the generated encoded data to the transmitting unit 340. Note that the area other than the target area (non-target area) referred to herein includes either the area other than the target area in a frame in which the target area is identified or the entire area in a frame in which the target area is not identified.

The transmitting unit 340 transmits the encoded data reported by the processing unit 330 to the administrator terminal 120 via the network 130.

The monitoring unit 350 monitors the communication time when the transmitting unit 340 transmits the encoded data, for example, for every month. Further, the monitoring unit 350 monitors the communication amount of the encoded data transmitted by the transmitting unit 340, for example, for every month. Further, the monitoring unit 350 compares the communication time and communication amount being monitored, with the communication time upper limit value and the allocated communication amount reported by the process control unit 320. Further, the monitoring unit 350 transmits a warning to the workers 151, 152, etc., or interrupts transmission of encoded data, etc., when the communication time and communication amount being monitored satisfy a predetermined condition.

<Description of Parameter Set>

Next, the multiple parameter sets stored in the parameter storage unit 360 will be described. FIG. 4 illustrates an example of parameter sets stored in the parameter storage unit.

As illustrated in FIG. 4, a parameter set is stored in the parameter storage unit 360 for each image capturing mode, and for each allocated communication time and communication time upper limit value.

Among these, a parameter set 410 is read when "image capturing mode 1" is input as the image capturing mode, "XX1" is input as the allocated communication time, and "YY1" is input as the communication time upper limit value. "Image capturing mode 1" is a mode that is selected when performing equipment inspection, and is basically a mode in which images are captured at high resolution and a low frame rate.

Note that a parameter set 411 is read when "image capturing mode 1" is input as the image capturing mode, "XX1'" is input as the allocated communication amount, and "YY1'" is input as the communication time upper limit value. Even when the image capturing mode is the same, a different parameter set is read when the allocated communication amount and the communication time upper limit value are different.

For example, in the parameter set 411, it is assumed that each parameter is defined so that the communication amount is more reduced compared to that of the parameter set 410. Therefore, when the workers 151, 152, etc., input "XX1'" as the allocated communication amount and input "YY1'" as the communication time upper limit value in order to reduce the communication amount and communication time when performing equipment inspection, the parameter set 411 will be read.

Further, a parameter set 420 is the parameter set read when "image capturing mode 2" is input as the image capturing mode, "XX2" is input as the allocated communication amount, and "YY2" is input as the communication time upper limit value. "Image capturing mode 2" is the mode to be selected when performing field investigation, and is basically the mode in which images are captured at low resolution and a high frame rate.

Note that a parameter set 421 is read when "image capturing mode 2" is input as the image capturing mode, "XX2'" is input as the allocated communication amount, and "YY2'" is input as the communication time upper limit value. Even when the image capturing mode is the same, a different parameter set is read when the allocated communication amount and the communication time upper limit value are different.

For example, in the parameter set 421, it is assumed that each parameter is defined so that the communication amount is more reduced compared to that of the parameter set 420. Therefore, when the workers 151, 152, etc., input "XX2'" as the allocated communication amount and input "YY2'" as the communication time upper limit value in order to reduce the communication amount and communication time when performing the field investigation, the parameter set 421 will be read.

Further, a parameter set 430 is read when "image capturing mode 3" is input as the image capturing mode, "XX2" is input as the allocated communication amount, and "YY2" is input as the communication time upper limit value. "Image capturing mode 3" is a mode selected when providing work support, and is basically a mode in which images are captured at high resolution and a high frame rate.

Note that a parameter set 431 is read when "image capturing mode 3" is input as the image capturing mode, "XX3'" is input as the allocated communication amount, and "YY3'" is input as the communication time upper limit value. Even when the image capturing mode is the same, a different parameter set is read when the allocated communication amount and the communication time upper limit value are different.

For example, in the parameter set 431, it is assumed that each parameter is defined so that the communication amount is more reduced compared to that of the parameter set 430. Therefore, when the workers 151, 152, etc., input "XX3'" as the allocated communication amount and input "YY3" as the communication time upper limit value in order to reduce the communication amount and communication time when performing work support, the parameter set 431 will be read.

Further, a parameter set 440 is read when "image capturing mode 4" is input as the image capturing mode, "XX4'" is input as the allocated communication amount, and "YY4'" is input as the communication time upper limit value. "Image capturing mode 4" is the mode to be selected when performing equipment maintenance, and is basically a mode in which images are captured at medium resolution and a medium frame rate.

Note that a parameter set 441 is read when "image capturing mode 4" is input as the image capturing mode, "XX4'" is input as the allocated communication amount, and "YY4'" is input as the communication time upper limit value. Even when the image capturing mode is the same, a different parameter set is read when the allocated communication amount and the communication time upper limit value are different.

For example, it is assumed that each parameter in the parameter set 441 is defined so that the communication amount is more reduced compared to that of the parameter set 440. Therefore, when the workers 151, 152, etc., input "XX4'" as the allocated communication amount and input "YY4'" as the communication time upper limit value in order to reduce the communication amount and communication time when performing equipment maintenance, the parameter set 441 will be read.

As illustrated in FIG. 4, the parameter sets 410 to 440 and 411 to 441 each include, as information items, "scene (type of work content)", "target", "parameter", "allocated communication amount", and "communication time upper limit value".

The information stored at "scene (type of work content)" is information about a specific scene (type of work content) (and a condition predetermined to identify the scene (scene condition)). For example, when equipment inspection is performed, the specific type of work content includes moving to the location where the equipment to be inspected is installed, inspecting the equipment to be inspected, etc. Therefore, "scene (type of work content)" stores "moving" and "inspecting" (in the example of FIG. 4, the scene condition is omitted).

The information stored at "target" is information (target information) used to recognize the target in a moving image captured by the worker in each scene. For example, in the moving image captured while moving for equipment inspection, there is no target to be recognized, so the "target" field is left blank.

On the other hand, in the case of a moving image captured during equipment inspection, it is necessary to distinguish between the air conditioner to be inspected and a device other than the air conditioner not to be inspected. Therefore, the information stored at "target" that is "during inspection" is information used to recognize the "air conditioner" and the information used to recognize "other than air conditioner".

The "parameters" further include "resolution", "frame rate", "key frame interval", and "quantization value".

The information stored at "resolution" is the resolution set when the resolution is changed, among various processing processes performed on the moving image by the processing unit 330. The example in FIG. 4 illustrates that when equipment inspection is performed, the resolution is set to a different value (parameter) by switching for each "scene (type of work content)" and "target". Specifically, when performing equipment inspection, "R5" is set as the resolution for a moving image captured "during moving". Further, "R10" is set as the resolution for the "air conditioner" area and "R5" is set as the resolution for the "other than air conditioner" area in a moving image captured "during inspection".

The information stored at "frame rate" is the frame rate set when changing the frame rate, among various processing processes performed on the moving image by the processing unit 330. The example in FIG. 4 illustrates that when equipment inspection is performed, the frame rate is set to a different value (parameter) by switching for each "scene (type of work content)". Specifically, the example illustrates that when equipment inspection is performed, "Fr3" is set as the frame rate for a moving image captured "during movement" and "Fr3" is set as the frame rate for a moving image captured "during inspection".

The information stored at "key frame interval" is the key frame interval set when an encoding process is performed upon changing the key frame interval, among various processing processes performed on the moving image by the processing unit 330. The example in FIG. 4 illustrates that when equipment inspection is performed, the key frame interval is set to a different value (parameter) by switching for each "scene (type of work content)". Specifically, when equipment inspection is performed, for the moving image captured "during moving", the encoding process is performed upon setting "Ki2" as the key frame interval. Further, for a moving image captured "during inspection", the encoding process is performed upon setting "Ki1" as the key frame interval.

The information stored at "quantization value" is the quantization value set when the encoding process is performed upon changing the quantization value, among various processing processes performed on the moving image by the processing unit 330. The example in FIG. 4 illustrates that when equipment inspection is performed, different values (parameters) are set by switching the quantization value for each "scene (type of work content)" and each "target". Specifically, it is illustrated that when equipment inspection is performed, an encoding process is performed with "Q5" set as the quantization value for a moving image captured "during moving". Further, it is illustrated that in a moving image captured "during inspection", the encoding process is performed with "Q1" set as the quantization value for an area of "air conditioner", and the encoding process is performed with "Q3" set as the quantization value for an area of "other than air conditioner".

The information stored at "allocated communication amount" is variations in the communication amount allocated to each image capturing mode when a moving image is captured under each image capturing mode and transmitted to the administrator terminal 120. The example in FIG. 4 illustrates that there are two types of "allocated communication amount" when equipment inspection is performed, that is, "XX1" or "XX1'".

The information stored at "communication time upper limit value" is variations of the upper limit value of the communication time allocated to each image capturing mode when a moving image is captured under each image capturing mode and transmitted to the administrator terminal 120. The example in FIG. 4 illustrates that there are two types of "communication time upper limit value" when equipment inspection is performed, that is, "YY1" or "YY1'".

As described above, it is assumed that information stored at "resolution", "frame rate", "key frame interval", and "quantization value" of "parameter" is values corresponding to "allocated communication amount" and "communication time upper limit value".

<Details of Functional Configuration of Processing Unit>

Figure 5:
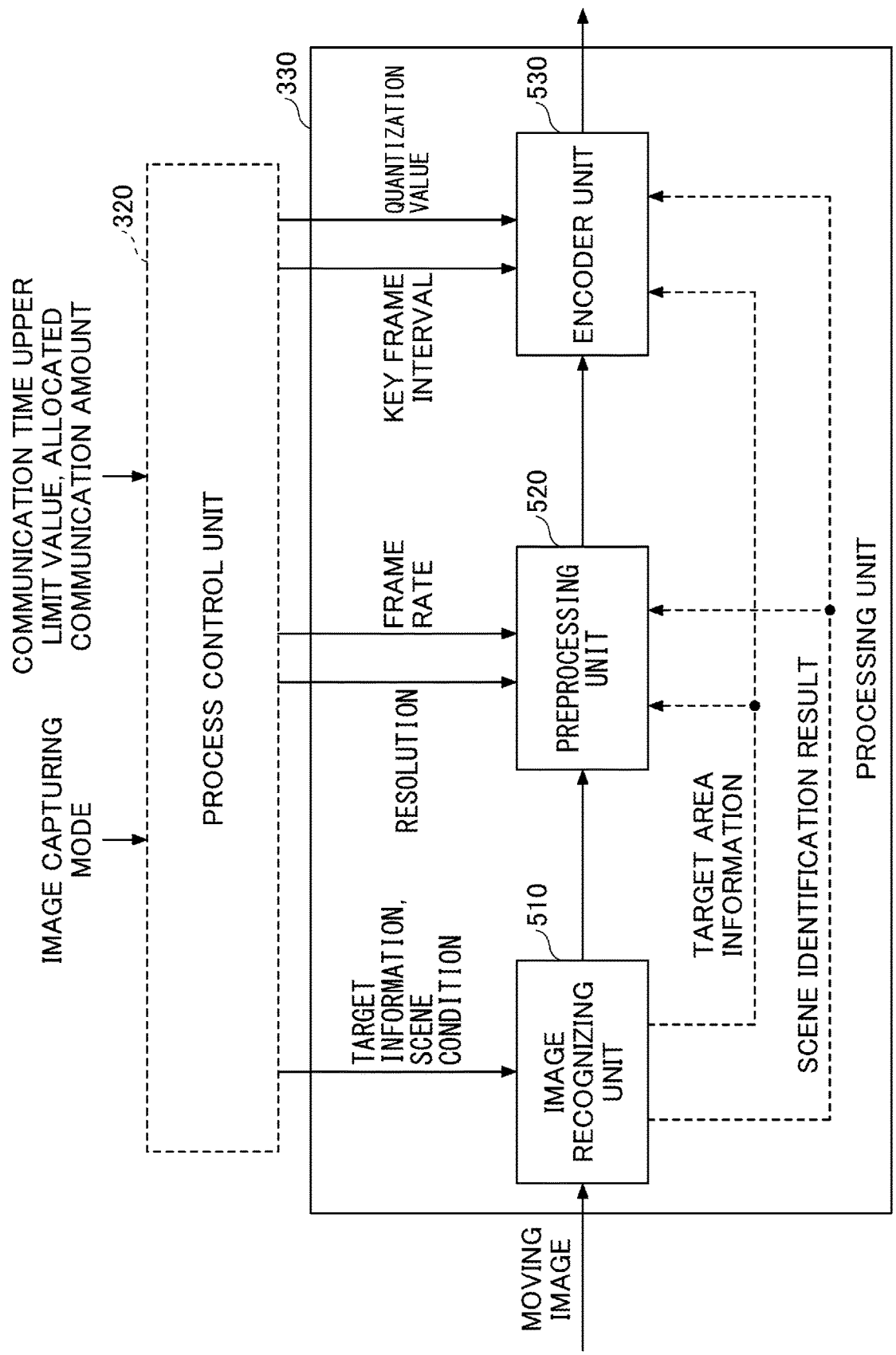
FIG. 5 illustrates the details of a functional configuration of a processing unit.

Next, details of the functional configuration of the processing unit 330 of the worker terminal 110 will be described. FIG. 5 illustrates details of the functional configuration of the processing unit.

As illustrated in FIG. 5, the processing unit 330 further includes an image recognizing unit 510, a preprocessing unit 520, and an encoder unit 530.

When a moving image is reported by the camera control unit 310, an image recognizing unit 510 performs an image recognition process on the reported moving image in units of frames to determine whether the moving image includes a target and to determine the area in which the target is included. The image recognizing unit 510 determines whether the target is included in the moving image based on the target information. Further, the image recognizing unit 510 reports, to the preprocessing unit 520 and the encoder unit 530, the area including the target as the target area information.

Further, the image recognizing unit 510 identifies the scene (type of work content) represented by the acquired moving image. The image recognizing unit 510 identifies the scene represented by the moving image based on the scene conditions. Further, the image recognizing unit 510 reports, to the preprocessing unit 520 and the encoder unit 530, the identified scene as the scene identification result.

Further, the image recognizing unit 510 reports the acquired moving image to the preprocessing unit 520.

Upon acquiring the moving image from the image recognizing unit 510, the preprocessing unit 520 performs various preprocesses on the acquired moving image. The preprocessing unit 520 refers to the parameter set reported from the process control unit 320 and identifies parameters (resolution, frame rate) according to the target area information and the scene identification result. Further, the preprocessing unit 520 sets the identified parameters and performs a preprocess.

When the moving image after preprocessing is acquired by the preprocessing unit 520, the encoder unit 530 performs an encoding process on the acquired moving image. The encoder unit 530 refers to the parameter set reported by the process control unit 320 and identifies parameters (keyframe interval, quantization value) according to the target area information and the scene identification result. Further, the preprocessing unit 520 sets the identified parameters and performs an encoding process.

<Specific Example of Preprocessing by the Preprocessing Unit>

Figure 6:
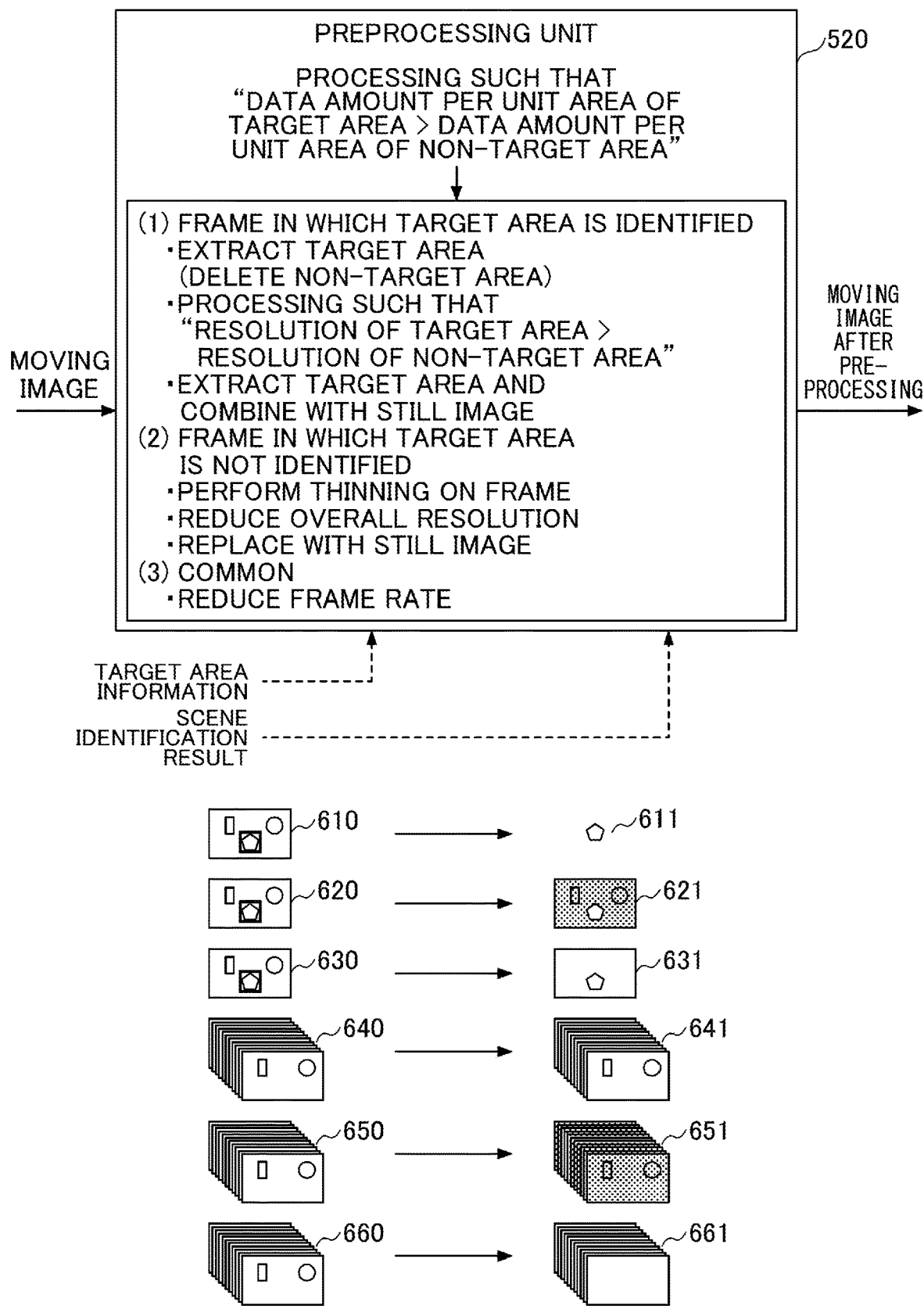
FIG. 6 illustrates a specific example of preprocessing by a preprocessing unit.

Next, a specific example of preprocessing by the preprocessing unit 520 will be described. FIG. 6 illustrates a specific example of preprocessing by the preprocessing unit. As illustrated in FIG. 6, the preprocessing unit 520 preprocesses the moving image reported by the image recognizing unit 510 so that the data amount per unit area of the non-target area becomes smaller than the data amount per unit area of the target area.

The preprocessing performed by the preprocessing unit 520 includes any of the following:
(1) a process performed when the image recognizing unit 510 determines that a target is included and the area including the target is reported as target area information;
(2) a process performed when the image recognizing unit 510 determines that the target is not included and the target area information is not reported; and
(3) a common process performed regardless of whether the image recognizing unit 510 determines that the target is included or not.

The processes are explained in order below. Which of the following preprocesses is performed is determined based on the reported parameter set, the target area information, and the scene identification result.

(1) When it is Determined that a Target is Included (when a Target Area is Identified)

(1-1) Extracting Process

When the image recognizing unit 510 determines that a target is included and an area including the target is reported as target area information, the preprocessing unit 520 performs an extracting process to extract the target area from the moving image (to delete the non-target area) and generates a moving image after preprocessing.

In the specific example of FIG. 6, a frame 610 of a moving image includes one target (here, for illustrative purposes, this is represented by a pentagonal figure) and two objects other than the target (here, for illustrative purposes, these are represented by a square figure and a circle figure). Note that a rectangle illustrated with thick lines surrounding one target indicates that the target is recognized as a target by the image recognizing unit 510.

As illustrated in the specific example in FIG. 6, when the preprocessing unit 520 performs an extracting process on the frame 610 of the moving image, the target area is extracted from the frame 610 of the moving image, and a moving image 611 after preprocessing is generated.

(1-2) Resolution Changing Process

When the image recognizing unit 510 determines that a target is included and reports target area information, the preprocessing unit 520 performs a resolution changing process to make a change in the moving image so that the target area and the non-target area have different resolutions, and generates a moving image after preprocessing. Specifically, the preprocessing unit 520 generates a moving image after preprocessing by performing a resolution changing process so that the resolution of "the target area>the resolution of the non-target area".

In the specific example of FIG. 6, a frame 620 of the moving image includes one target and two objects other than the target.

As illustrated in the specific example of FIG. 6, when the preprocessing unit 520 performs a resolution changing process on the frame 620 of the moving image, a moving image 621 after preprocessing, in which the resolution is changed so that the target area and the non-target area have different resolutions, is generated. In the moving image 621 after preprocessing, the hatched area (the non-target area) illustrates a lower resolution than the white area (the target area).

In the example of FIG. 6, a case where a moving image after the preprocessing is generated by performing a resolution changing process so that "resolution of the target area>resolution of the non-target area" is described, but the processing method of the resolution changing process is not limited to this.

For example, the moving image after the preprocessing may be generated by performing the resolution changing process so that "resolution of (target area+peripheral area) >resolution of the area other than (target area+peripheral area)" is obtained. In performing the resolution changing process, it is assumed that the parameter set defines a physical quantity specifying the peripheral area of the target in association with information used for recognizing the target. Thus, the preprocessing unit 520 can determine the size of the peripheral area by referring to the parameter set.

(1-3) Combining Process

When the image recognizing unit 510 determines that a target is included and the area including the target is reported as target area information, the preprocessing unit 520 extracts the target area from the moving image, performs a combining process to combine the target area with a predetermined still image, and generates a moving image after preprocessing.

In the specific example of FIG. 6, a frame 630 of the moving image includes one target and two objects other than the target.

As illustrated in the specific example in FIG. 6, when the preprocessing unit 520 performs a combining process on the frame 630 of the moving image, the target area is extracted from the frame 630 of the moving image and is combined with a still image (in the example of FIG. 6, a white background image) to generate a moving image 631 after preprocessing.

(2) When it is Determined that a Target is not Included (when a Target Area is not Identified)

(2-1) Thinning Process

When it is determined by the image recognizing unit 510 that the target is not included and the target area information is not reported, the preprocessing unit 520 performs a thinning process to remove a predetermined frame from the moving image and generates a moving image after preprocessing.

In the specific example of FIG. 6, a frame group 640 of the moving image includes only two objects (here, for illustrative purposes, these are represented by a square figure and a circle figure) other than the target, and does not include a target (for example, a pentagonal figure).

As illustrated in the specific example of FIG. 6, when the preprocessing unit 520 performs a thinning process on the frame group 640 of the moving image, a predetermined frame is deleted from the frame group 640 of the moving image, and a frame group 641 of the moving image after the preprocessing is generated.

(2-2) Overall Resolution Changing Process

When the image recognizing unit 510 determines that a target is not included and target area information is not reported, the preprocessing unit 520 performs an overall resolution changing process to change the resolution of the entire frame for each frame of the moving image, and generates a moving image after preprocessing.

Specifically, the preprocessing unit 520 generates a moving image after preprocessing by performing a resolution changing process so that "the resolution of a target area of a frame including a target>the resolution of the frame without the target".

In the specific example of FIG. 6, a frame group 650 of the moving image includes only two objects other than a target, and does not include a target.

As illustrated in the specific example of FIG. 6, the resolution of the entire frame is changed for the frame group 650 of the moving image by the preprocessing unit 520 performing an overall resolution changing process on the frame group 650 of the moving image, and a frame group 651 of the moving image after preprocessing is generated. In the frame group 651 of the moving image after the preprocessing, the resolution of each hatched frame is lower than the resolution of a target area of a frame determined to include a target.

(2-3) Replacing Process

When the image recognizing unit 510 determines that a target is not included and target area information is not reported, the preprocessing unit 520 performs a replacing process to replace each frame of the moving image with a predetermined still image, and generates a moving image after preprocessing.

In the specific example of FIG. 6, a frame group 660 of the moving image includes only two objects other than a target, and does not include a target.

As illustrated in the specific example of FIG. 6, when the preprocessing unit 520 performs a replacing process on the frame group 660 of the moving image, the frame group 660 of the moving image is entirely replaced with still images, and a frame group 661 of the moving image after the preprocessing is generated.

(3) Common Process

Regardless of whether the image recognizing unit 510 determines that a target is included or not, the preprocessing unit 520 performs a frame rate reducing process to reduce the frame rate by deleting a predetermined frame from the moving image, and generates a moving image after preprocessing.

Although specific examples of the frame rate reducing process are omitted in FIG. 6, the frame rate reducing process will have specific examples similar to, for example, those of the thinning process for the frame group 640 of a moving image.

<Specific Example of Encoding Process by the Encoder Unit>

Figure 7:
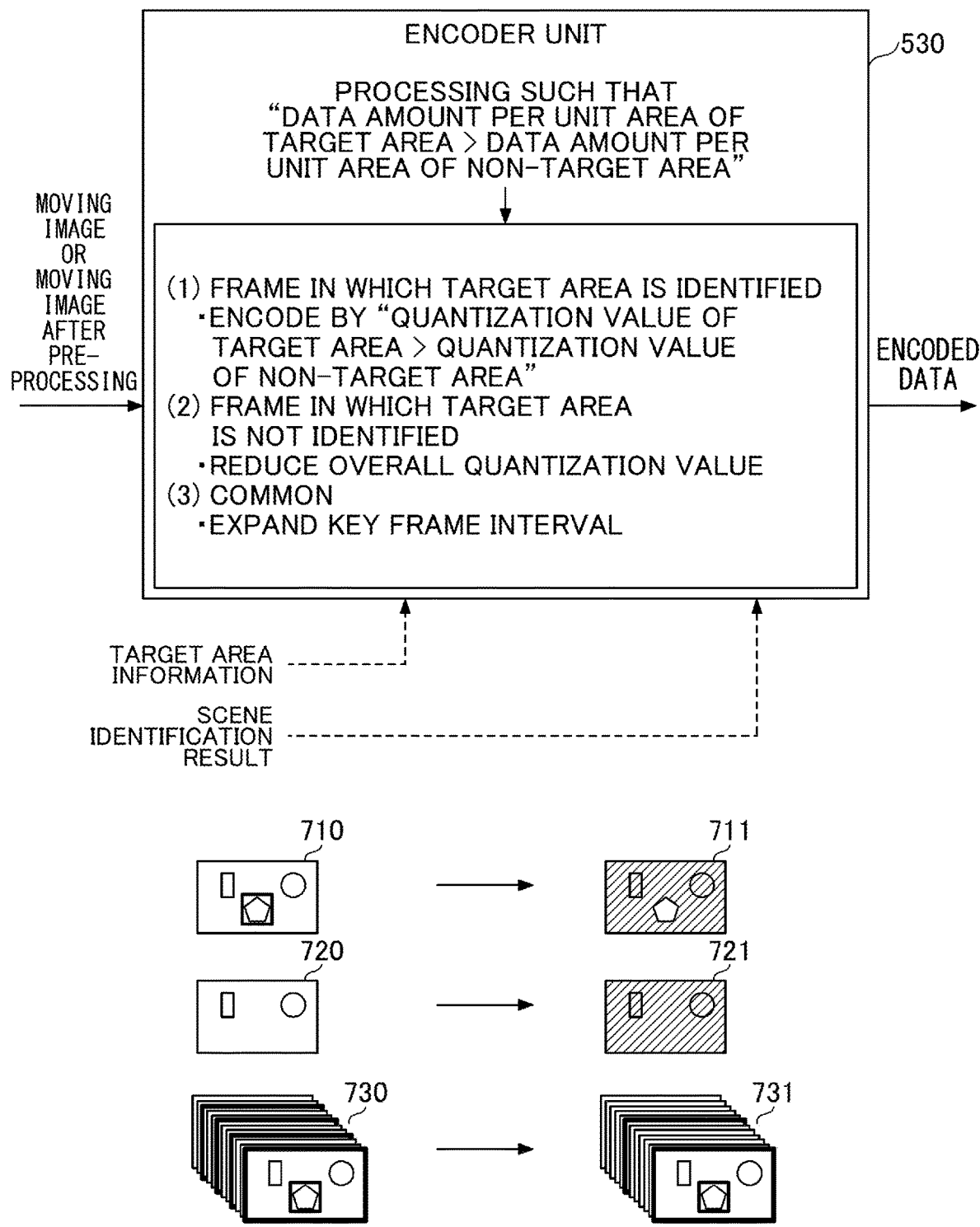
FIG. 7 illustrates a specific example of an encoding process by an encoder unit.

Next, a specific example of an encoding process by the encoder unit 530 will be described. FIG. 7 illustrates a specific example of an encoding process by the encoder unit. As illustrated in FIG. 7, the encoder unit 530 performs an encoding process on the acquired moving image or the moving image after preprocessing so that the data amount per unit area of the non-target area is smaller than the data amount per unit area of the target area.

The encoding process performed by the encoder unit 530 includes any of the following:

(1) a process performed when the image recognizing unit 510 determines that a target is included and an area including the target is reported as target area information;

(2) a process performed when the image recognizing unit 510 determines that a target is not included and target area information is not reported;

(3) a common process to be performed regardless of whether the image recognizing unit 510 determines that a target is included or not included.

The processes are explained in order below (in the following, for the sake of simplicity of explanation, a case where a process is performed on a moving image is described). Further, which of the following encoding processes is performed is determined based on the reported parameter set, the target area information, and the scene identification result.

(1) When it is Determined that a Target is Included (when a Target Area is Identified)

When the image recognizing unit 510 determines that a target is included and target area information is reported, the encoder unit 530 generates encoded data by performing an encoding process on the moving image by using different quantization values for the target area and the non-target area.

Specifically, encoding data is generated by performing an encoding process by using quantization values satisfying "quantization value of the target area>quantization value of the non-target area".

In the specific example of FIG. 7, a frame 710 of the moving image includes one target and two objects other than the target.

As illustrated in the specific example of FIG. 7, for the frame 710 of the moving image, the encoder unit 530 performs an encoding process by using different quantization values in the target area and the non-target area to generate encoded data 711. In the encoded data 711, the hatched area (the non-target area) indicates that encoding process has been performed by using smaller a quantization value than that used in the white area (the target area).

(2) When it is Determined that a Target is not Included (a Target Area is not Identified)

When it is determined by the image recognizing unit 510 that a target is not included and target area information is not reported, the encoder unit 530 generates encoded data by changing the quantization value of the entire frame and performing an encoding process for each of the frames of the moving image.

Specifically, encoding data is generated by performing an encoding process by using quantization values satisfying "the quantization value of the target area of the frame including the target>the quantization value of the frame without the target".

In the specific example of FIG. 7, a frame 720 of the moving image includes only two objects other than a target, and does not include a target.

As illustrated in the specific example of FIG. 7, for the frame 720 of the moving image, the encoder unit 530 changes the quantization value of the entire frame and performs encoding process to generate encoded data 721. In the encoded data 721, the hatched frame indicates that encoding process has been performed by using a quantization value lower than the quantization value of the target area of the frame including the target.

(3) Common Process

Regardless of whether the image recognizing unit 510 determines that a target is included or not, the encoder unit 530 generates encoded data by changing the intervals between key frames and performing an encoding process for each frame of the moving image.

In the specific example illustrated in FIG. 7, the frames illustrated with thick lines in frame groups 730 and 731 of the moving image represent key frames.

Among these, the frame group 730 of the moving image has a key frame interval before changing the key frame interval. On the other hand, the frame group 731 of the moving image has a key frame interval after changing the key frame interval.

In this way, the encoder unit 530 performs an encoding process on the frame group of the moving image by extending the key frame interval.

<Operation Example of the Worker Terminal in Each Case>

Figure 8:
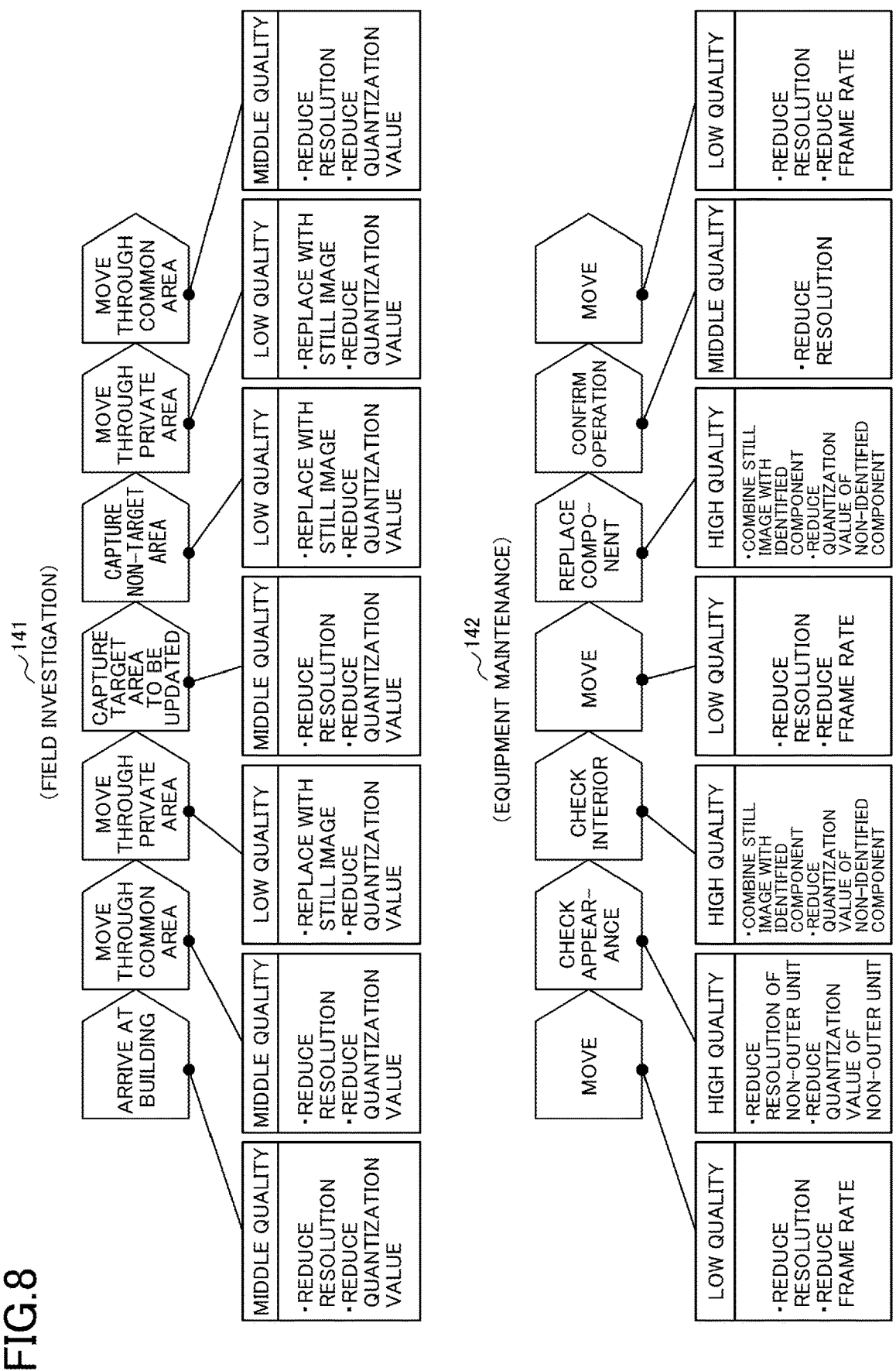
FIG. 8 illustrates an example of an operation of the worker terminal in each case.

Next, an operation example of the worker terminal 110 in each case (here, a case in which a field investigation is conducted and a case in which equipment maintenance is performed by using the worker terminal 110) in which the worker terminal 110 is used in the work site is explained. FIG. 8 illustrates an operation example of the worker terminal in each case.

As explained in FIG. 1, a reference numeral 141 denotes a case in which a worker 151 uses the worker terminal 110 to perform field investigation at a work site.

The example in FIG. 8 illustrates that in field investigation, a moving image captured by a worker terminal 110 upon arrival at a building is preprocessed to reduce the resolution thereof, and is then subjected to an encoding process with a reduced quantization value, and is transmitted as medium quality encoded data.

Similarly, a moving image captured by the worker terminal 110 while moving through a common area is preprocessed to reduce the resolution thereof, and is then subjected to an encoding process with a reduced quantization value, and is transmitted as medium quality encoded data.

Further, a moving image captured by the worker terminal 110 while moving through a private area is preprocessed to replace each frame with a still image, and is then subjected to an encoding process with a reduced quantization value, and is transmitted as low quality encoded data.

Further, a moving image captured by the worker terminal 110 in an area to be updated is preprocessed to reduce the resolution, and is then subjected to an encoding process with a reduced quantization value, and is transmitted as medium quality encoded data.

Further, a moving image captured by the worker terminal 110 in a non-target area is preprocessed by replacing each frame with a still image, and is then subjected to an encoding process with a reduced quantization value, and is transmitted as low quality encoded data.

Further, a moving image captured by the worker terminal 110 while moving through a private area is preprocessed by replacing each frame with a still image, and is then subjected to an encoding process with a reduced quantization value, and is transmitted as low quality encoded data.

Further, a moving image captured by the worker terminal 110 while moving through a common area is preprocessed by reducing the resolution, and is then subjected to an encoding process with a reduced quantization value, and is then transmitted as medium quality encoded data.

On the other hand, a reference numeral 142 illustrates a case in which a worker 152 uses the worker terminal 110 when performing equipment maintenance at the work site.

The example in FIG. 8 illustrates that in equipment maintenance, a moving image captured by the worker terminal 110 while moving is preprocessed to reduce the resolution of the entire frame and is preprocessed to reduce the frame rate, and is then transmitted as low quality encoded data.

Further, a moving image captured by the worker terminal 110 during the appearance check is preprocessed to reduce the resolution of the area other than the area of the outdoor unit (non-outdoor unit), and is then subjected to an encoding process with a reduced quantization value, and is transmitted as high quality encoded data.

Further, a moving image captured by the worker terminal 110 during the interior check is preprocessed to extract the area of an identified component and to combine the area with a still image, and is then subjected to an encoding process with a reduced quantization value for the background area, and is transmitted as high quality encoded data.

Further, a moving image captured by the worker terminal 110 while moving is preprocessed to reduce the resolution of the entire frame and is preprocessed to reduce the frame rate, and is transmitted as low quality encoded data.

Further, a moving image captured by the worker terminal 110 while replacing a component is preprocessed to extract the area of the identified component and to combine the area with a still image, and is then subjected to an encoding process with a reduced quantization value for the background area, and is transmitted as high quality encoded data.

Further, a moving image captured by the worker terminal 110 during the operation confirmation is preprocessed to reduce the resolution and is transmitted as medium quality encoded data.

Further, a moving image captured by the worker terminal 110 while moving is preprocessed to reduce the resolution of the entire frame and is preprocessed to reduce the frame rate, and is transmitted as low quality encoded data.

<Flow of Moving Image Process>

Figure 9:
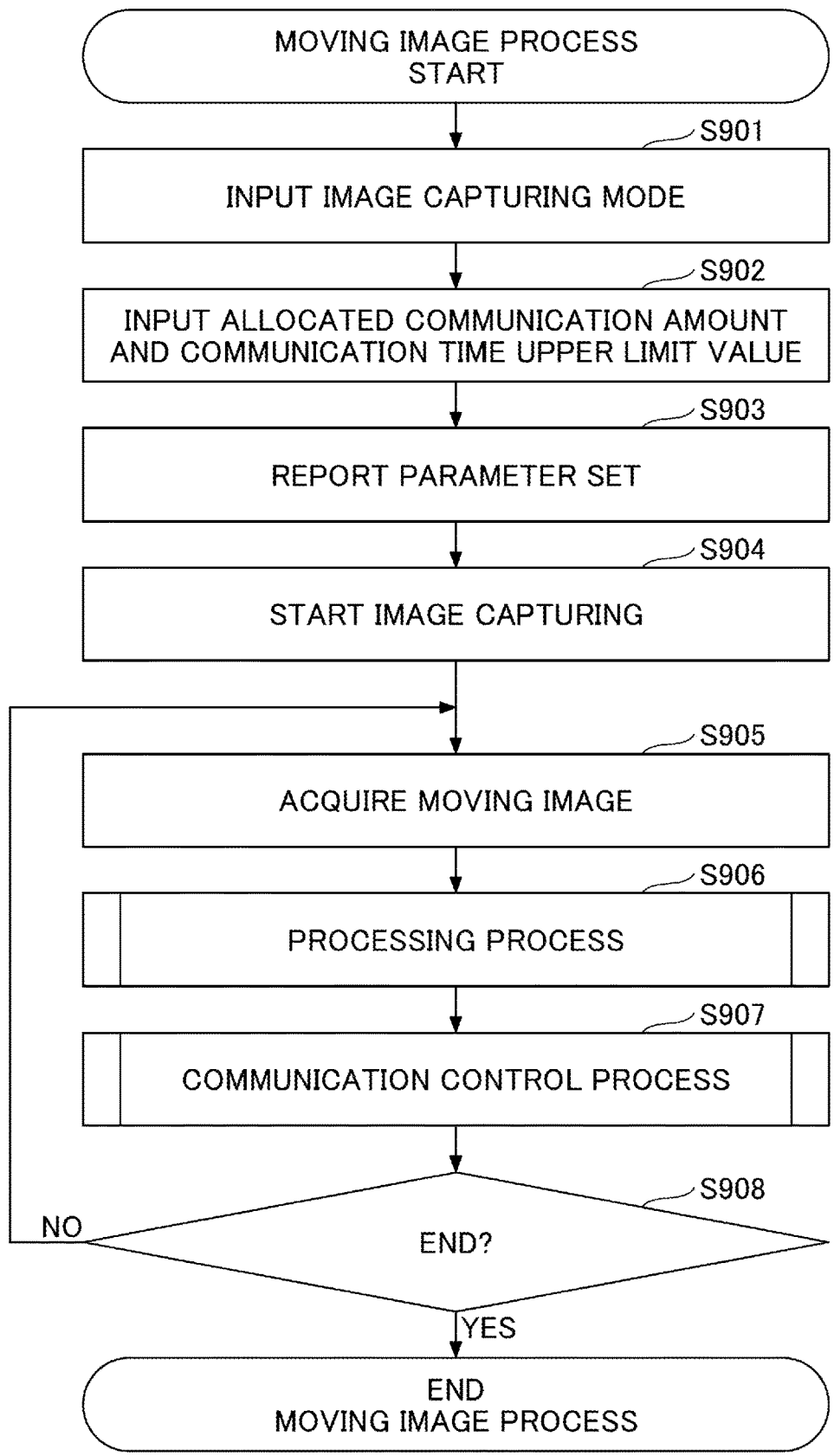
FIG. 9 is a flow chart illustrating the flow of a moving image process.

Next, the flow of moving image processing by the worker terminal 110 will be described. FIG. 9 is a flowchart illustrating the flow of moving image processing.

In step S901, the process control unit 320 receives the image capturing mode input by the worker.

In step S902, the process control unit 320 receives the allocated communication amount and the communication time upper limit value input by the worker.

In step S903, the process control unit 320 reads the image capturing mode input by the worker, and the parameter set according to the allocated communication amount and the communication time upper limit value, and reports this information to the processing unit 330.

In step S904, the camera control unit 310 receives an instruction to start image capturing from the worker.

In step S905, the camera control unit 310 starts capturing a moving image.

In step S906, the processing unit 330 performs a processing process on the acquired moving image to generate encoded data. Details of the processing process will be described later with reference to FIG. 10.

In step S907, the transmitting unit 340 performs a communication control process to transmit the generated encoded data. Details of the communication control process will be described later with reference to FIG. 11.

In step S908, the camera control unit 310 determines whether to end the moving image process. When it is determined in step S908 that the moving image process is not to be ended (NO in step S908), the process returns to step S905. On the other hand, when it is determined in step S908 that the moving image process is to be ended (YES in step S908), the process ends.

<Flow of Processing Process>

Figure 10:
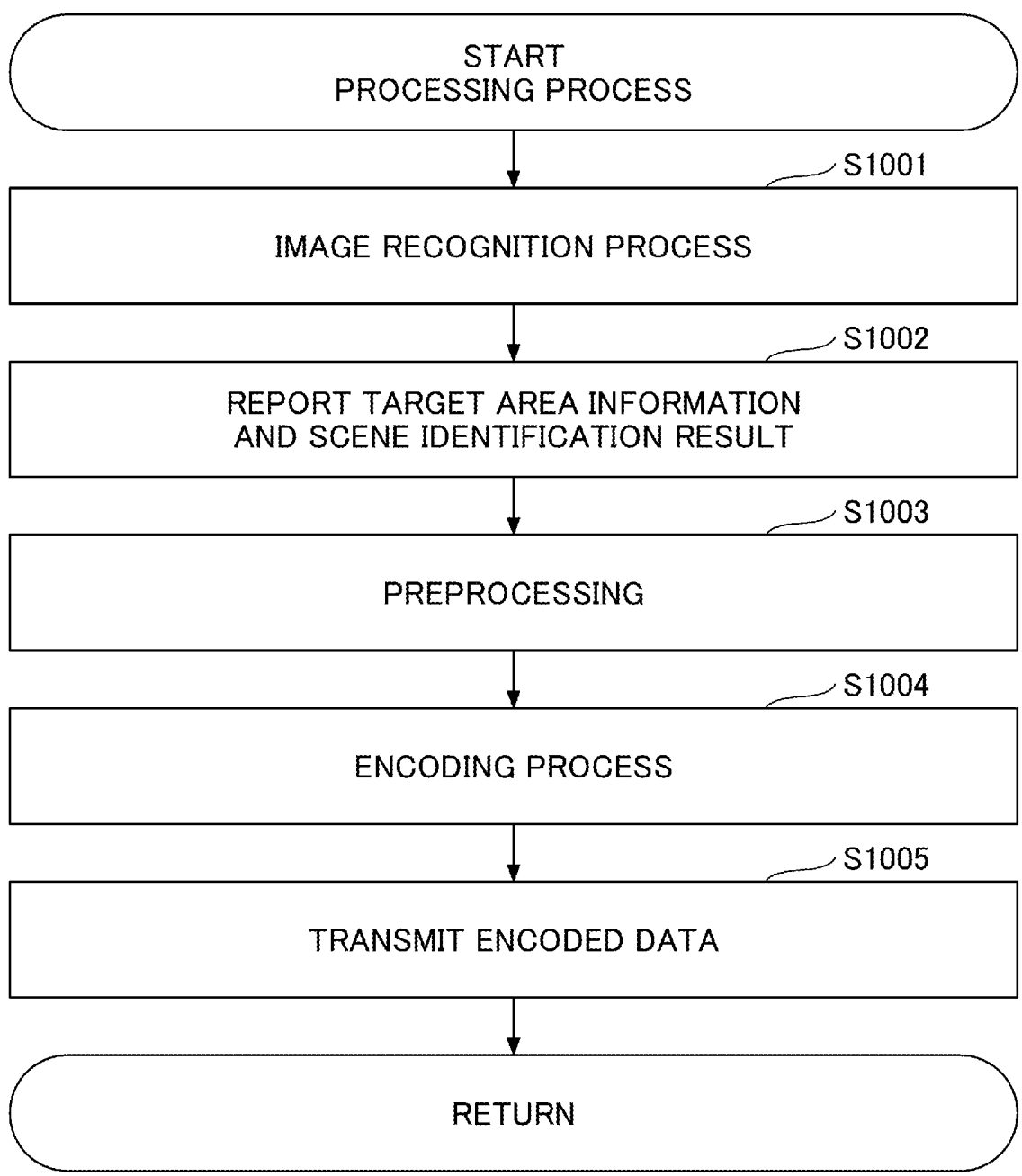
FIG. 10 is a flow chart illustrating the flow of a processing process.

Next, the details of the processing process in step S906 of FIG. 9 will be described. FIG. 10 is a flowchart illustrating the flow of the processing process.

In step S1001, the image recognizing unit 510 performs an image recognition process on the acquired moving image.

In step S1002, the image recognizing unit 510 reports the target area information and the scene identification result identified by the image recognition process to the preprocessing unit 520 and the encoder unit 530.

In step S1003, the preprocessing unit 520 performs preprocessing (an extracting process, a resolution changing process, a combining process, a thinning process, an overall resolution changing process, a replacing process, etc.) on the moving image based on the parameter set, the target area information, and the scene identification result.

In step S1004, the encoder unit 530 performs an encoding process on the moving image after the preprocessing based on the parameter set, the target area information, and the scene identification result to generate encoded data.

In step S1005, the transmitting unit 340 transmits the encoded data to the administrator terminal 120.

<Flow of Communication Control Process>

Figure 11:
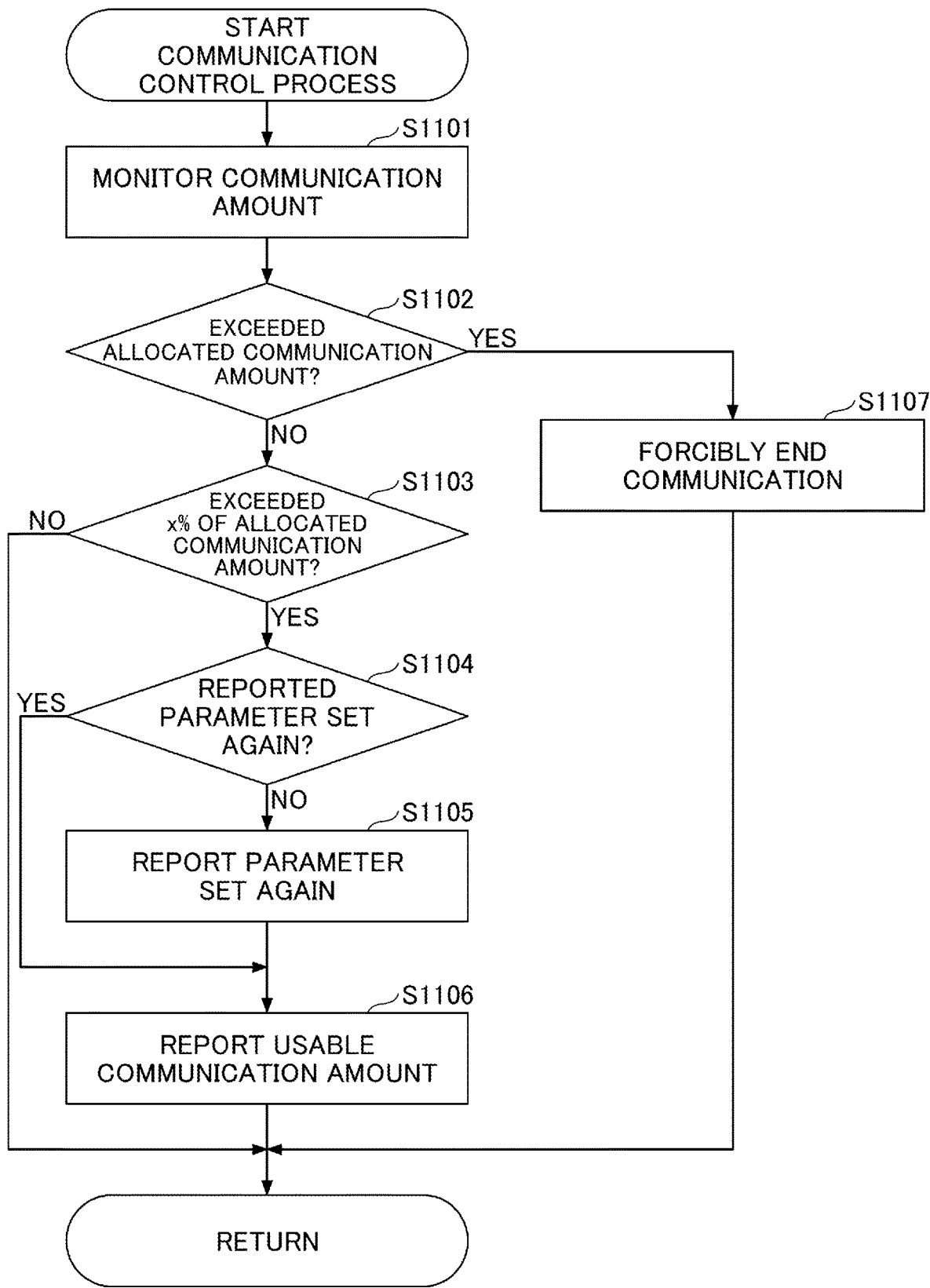
FIG. 11 is a flow chart illustrating the flow of a communication control process.

Next, the details of the communication control process in step S907 of FIG. 9 will be described. FIG. 11 is a flowchart illustrating the flow of the communication control process.

In step S1101, the monitoring unit 350 monitors the communication amount (or communication time) of the encoded data transmitted by the transmitting unit 340 to the administrator terminal 120.

In step S1102, the monitoring unit 350 determines whether the communication amount (or communication time) communicated by the transmitting unit 340 exceeds the allocated communication amount (or communication time upper limit value).

When it is determined in step S1102 that the communication amount communicated by the transmitting unit 340 does not exceed the allocated communication amount (or communication time upper limit value) (NO in step S1102), the process proceeds to step S1103.

In step S1103, the monitoring unit 350 determines whether the communication amount (or communication time) communicated by the transmitting unit 340 exceeds a predetermined ratio (x %) of the allocated communication amount (or communication time upper limit value). When it is determined in step 31103 that the communication amount (or communication time) does not exceed a predetermined ratio (x %) of the allocated communication amount (or communication time upper limit value) (NO in step 31103), the process returns to step S908 in FIG. 9.

On the other hand, when it is determined in step 31103 that the communication amount (or communication time) exceeds a predetermined ratio (x %) of the allocated communication amount (or communication time upper limit value) (YES in step S1103), the process proceeds to step 31104.

In step 31104, the monitoring unit 350 determines whether the process control unit 320 has already reported a new parameter set to the processing unit 330.

When it is determined in step 31104 that the new parameter set has not yet been reported (NO in step 31104), the process proceeds to step S1105.

In step 31105, the process control unit 320 reports the new parameter set to the processing unit 330 and then proceeds to step 31106. The process control unit 320 specifies a new allocated communication amount (or a new upper communication time upper limit value) and reports, to the processing unit 330, a new parameter set according to the specified new allocated communication amount (or a new upper communication time upper limit value). In this case, the process control unit 320 functions as a changing unit for changing parameters.

On the other hand, when it is determined in step S1104 that a new parameter set has already been reported (YES in step S1104), the process proceeds directly to step S1106.

In step S1106, the monitoring unit 350 reports the usable communication amount (or communication time) to the worker, and then returns to step S908 in FIG. 9.

On the other hand, when it is determined in step S1102 that the communication amount (or communication time) communicated by the transmitting unit 340 exceeds the allocated communication amount (or communication time upper limit value) (YES in step S1102), the process proceeds to step S1107.

In step S1107, the monitoring unit 350 interrupts (forcibly ends) the transmission of encoded data by the transmitting unit 340 after outputting a warning to the workers 151, 152, etc., and returns to step S908 in FIG. 9. In this case, the transmitting unit 340 stores the encoded data generated by the processing unit 330 in a predetermined storage unit without transmitting the encoded data to the administrator terminal 120 thereafter.

\<Summary\>

As is clear from the above description, the worker terminal 110 according to the first embodiment has the following features:

- Connected to an administrator terminal and transmit a moving image to the support apparatus upon encoding the moving image, the administrator terminal being configured to support, from a remote location, work performed by a worker including installing, repairing, inspecting, or removing a device, based on the moving image captured at a work site.
- Includes a camera that captures a moving image, and identifies the target area by performing a recognition process on the moving image captured by the camera.
- When the target area is identified for the moving image, the moving image is processed so that the data amount per unit area during transmission differs between the target area and the non-target area.

Thus, according to the worker terminal 110 according to the first embodiment, when the moving image is transmitted by using the worker terminal, the communication amount can be reduced while maintaining the image quality of the target area.

Second Embodiment

In the first embodiment described above, an example of the operation of the worker terminal 110 when conducting field investigation and equipment maintenance at a work site is explained. However, it is obvious that the communication amount can be reduced while maintaining the image quality of the target area by similarly operating the worker terminal 110 in other cases (equipment inspection, work support, etc.).

Furthermore, in the first embodiment described above, when the image recognizing unit 510 performs an image recognition process, it is explained as identifying a scene (type of work content) by referring to a predetermined condition (scene condition) for each scene.

However, the method of identifying a scene (type of work content) is not limited to this, and the scene may be identified based on, for example, input information input by a worker into the worker terminal 110. Specifically, the worker terminal 110 has scene information indicating each scene in advance, and may identify the scene by determining which scene information the information input by the worker corresponds to.

Alternatively, the scene may be identified by referring to predetermined image information for each scene and determining which image information is included in the moving image.

In the first embodiment, a monitoring unit is arranged in the worker terminal 110 to monitor the communication amount (or communication time). However, a prediction unit may be further arranged in the worker terminal 110 to predict the additional communication time or the additional communication amount when, for example, the communication amount (or communication time) transmitted by the transmitting unit exceeds the allocated communication amount (or communication time upper limit value). Thus, the workers 151, 152, etc., can identify in advance the additional costs to be generated.

In the above first embodiment, it is explained that one parameter set is selected by inputting the image capturing mode (further, by inputting the communication time upper limit value or the allocated communication amount) by the workers 151, 152, etc. However, one parameter set may be configured to be directly selected by the workers 151, 152, etc.

In the first embodiment above, the parameter storage unit 360 is described as being implemented in the auxiliary storage device 203 of the worker terminal 110. However, the parameter storage unit 360 may be implemented in the auxiliary storage device of the administrator terminal 120, for example. In this case, the worker terminal 110 acquires the parameter set from the administrator terminal 120 via the network 130.

The embodiments are described above, and it will be understood that various changes in form and details are possible without deviating from the purpose and scope of the claims.

The present application is based upon and claims priority to Japanese Patent Application No. 2020-214111 filed on Dec. 23, 2020, the entire contents of which are incorporated herein by reference.

REFERENCE SIGNS LIST

100: remote support system
110: worker terminal
120: administrator terminal
204: operation device
205: display device
206: imaging device
207: communication device
208: voice input device
209: voice output device
310: camera control unit
320: process control unit
330: processing unit
340: transmitting part
350: monitoring part
410 to 440: parameter set
411 to 441: parameter set
510: image recognizing unit
520: preprocessing unit
530: encoder unit

The invention claimed is:

1. A worker terminal configured to be connected to a support apparatus and transmit a moving image to the support apparatus upon encoding the moving image, the support apparatus being configured to support, from a remote location, work performed by a worker including installing, repairing, inspecting, or removing a device, based on the moving image captured at a work site, the worker terminal comprising:

a processor;
a memory; and
a camera configured to capture the moving image,
wherein the processor is configured to:
perform a recognition process on the moving image captured by the camera to identify a target area;
acquire one parameter set among a plurality of parameter sets for processing the moving image, each of the plurality of parameter sets defining parameters that are different for the target area and a non-target area other than the target area, and
process the moving image, in response to the target area being identified in the moving image, by switching the parameters corresponding to the acquired one parameter set for the target area and the non-target area such that a data amount per unit area at a time of transmitting the moving image is different for the target area and the non-target area.

2. The worker terminal according to claim 1, further comprising:
an auxiliary storage device configured to store information used for recognizing a target in the recognition process, wherein
the processor is configured to identify an area of the target as the target area in response to recognizing the target in the recognition process.

3. The worker terminal according to claim 2, wherein
the auxiliary storage device is configured to store a physical amount specifying a peripheral area of the target in association with the information used for recognizing the target in the recognition process, and
the processor is configured to identify an area of the target and the peripheral area of the target as the target area in response to recognizing the target in the recognition process.

4. The worker terminal according to claim 1, wherein the processor is configured to process the moving image such that the data amount per unit area at a time of transmitting the moving image in the non-target area is less than the data amount per unit area at the time of transmitting the moving image in the target area.

5. The worker terminal according to claim 1,
wherein the processor is configured to acquire an image capturing mode, wherein
the processor acquires the one parameter set based on the image capturing mode.

6. The worker terminal according to claim 5, wherein the processor is configured to acquire the image capturing mode by receiving the image capturing mode via a network or by receiving the image capturing mode input by the worker.

7. The worker terminal according to claim 5, wherein the processor is configured to acquire the one parameter set based on at least one of a work content, a communication time upper limit value, or an allocated communication amount.

8. The worker terminal according to claim 7, wherein the processor is configured to:
monitor a communication time or a communication amount based on the communication time upper limit value or the allocated communication amount; and
perform control to output a warning or to interrupt the transmitting of the moving image and store the encoded moving image, in response to detecting that the communication time exceeds the communication time upper limit value or the communication amount exceeds the allocated communication amount.

9. The worker terminal according to claim 8,
wherein the processor is configured to change the plurality of parameter sets in response to detecting that the communication time exceeds the communication time upper limit value or the communication amount exceeds the allocated communication amount.

10. The worker terminal according to claim 8, wherein the processor is
configured to predict an additional communication time or an additional communication amount in response to detecting that the communication time exceeds the communication time upper limit value or the communication amount exceeds the allocated communication amount.

11. The worker terminal according to claim 7, wherein the processor is further configured to: identify a scene indicating a type of the work content with respect to the moving image,
acquire the one parameter set defining parameters that are different for each of the scenes, and
process the moving image by switching the parameters for each identified scene.

12. The worker terminal according to claim 11, wherein the processor is configured to:
process the moving image by changing a frame rate for each identified scene, or
process the moving image by encoding the moving image upon changing a key frame interval for each identified scene.

13. The worker terminal according to claim 11, wherein the processor is configured to identify the scene with respect to the moving image by referring to a condition predetermined for each scene or by receiving input information for identifying each scene, for identifying each scene based on the moving image.

14. The worker terminal according to claim 13, wherein the processor is configured to identify the scene with respect to the moving image by referring to image information predetermined for each scene and determining whether any piece of the image information is included in the moving image.

15. The worker terminal according to claim 13, wherein the processor is configured to identify the scene with respect to the moving image by determining which piece of predetermined scene information the received input information corresponds to.

16. The worker terminal according to claim 1, wherein the non-target area includes at least one of
an area other than the target area in a frame in which the target area is identified in the moving image, or
an entire area of a frame in which the target area is not identified in the moving image.

17. The worker terminal according to claim 16, wherein the processor is configured to:
process the moving image by extracting the target area from the frame in which the target area is identified, or
process the moving image by reducing a resolution of the non-target area to below a resolution of the target area in the frame in which the target area is identified, or
process the moving image by extracting the target area from the frame in which the target area is identified and combining the non-target area with a predetermined still image, or
process the moving image by encoding the moving image upon reducing a quantization value of the non-target area to below a quantization value of the target area in the frame in which the target area is identified.

18. The worker terminal according to claim 16, wherein the processor is configured to:
process the moving image by thinning the moving image by removing the frame in which the target area is not identified, or
process the moving image by reducing a resolution of the frame in which the target area is not identified to below a resolution of the target area in the frame in which the target area is identified, or
process the moving image by replacing the frame in which the target area is not identified with a predetermined still image, or process the moving image by encoding the moving image upon reducing a quantization value of the frame in which the target area is not identified to below a quantization value of the target area in the frame in which the target area is identified.

19. The worker terminal according to claim 1, wherein the processor is configured to acquire the one parameter set by receiving the one parameter set via a network or by extracting the one parameter set from the plurality of parameter sets stored in advance upon receiving a selection from the worker.

20. A moving image processing method performed in a worker terminal configured to be connected to a support apparatus and transmit a moving image to the support apparatus upon encoding the moving image, the support apparatus being configured to support, from a remote location, work performed by a worker including installing, repairing, inspecting, or removing a device, based on the moving image captured at a work site, the moving image processing method comprising:
  performing a recognition process on the moving image captured by a camera configured to capture the moving image, to identify a target area;
  acquiring one parameter set among a plurality of parameter sets for processing the moving image, each of the plurality of parameter sets defining parameters that are different for the target area and the non-target area; and
  processing the moving image, in response to detecting that the target area is identified in the moving image, by switching the parameters corresponding to the acquired one parameter set for the target area and the non-target area such that a data amount per unit area at a time of transmitting the moving image is different for the target area and a non-target area other than the target area.

21. A non-transitory computer-readable recording medium storing a moving image processing program that causes a computer in a worker terminal to execute a process, the worker terminal being configured to be connected to a support apparatus and transmit a moving image to the support apparatus upon encoding the moving image, the support apparatus being configured to support, from a remote location, work performed by a worker including installing, repairing, inspecting, or removing a device, based on the moving image captured at a work site, the process comprising:
  performing a recognition process on the moving image captured by a camera configured to capture the moving image, to identify a target area; [and] acquiring one parameter set among a plurality of parameter sets for processing the moving image, each of the plurality of parameter sets defining parameters that are different for the target area and the non-target area; and
  processing the moving image, in response to detecting that the target area is identified in the moving image, by switching the parameters corresponding to the acquired one parameter set for the target area and the non-target area such that a data amount per unit area at a time of transmitting the moving image is different for the target area and a non-target area other than the target area.

* * * * *